May 7, 1963 R. V. PROFFITT 3,088,396
BROILING OVEN
Filed March 24, 1961 2 Sheets-Sheet 1

Inventor:
Richard V. Proffitt,
by T G Dysart
His Attorney.

May 7, 1963  R. V. PROFFITT  3,088,396
BROILING OVEN
Filed March 24, 1961  2 Sheets-Sheet 2

Inventor:
Richard V. Proffitt,
by T G Dyson
His Attorney.

United States Patent Office 3,088,396
Patented May 7, 1963

3,088,396
BROILING OVEN
Richard V. Proffitt, Chicago Heights, Ill., assignor to General Electric Company, a corporation of New York
Filed Mar. 24, 1961, Ser. No. 98,039
8 Claims. (Cl. 99—443)

This invention relates to broiling ovens, and more particularly to portable broiling ovens sufficiently small in size to be carried about and used on kitchen counter tops and the like.

Broiling is a process of cooking food by exposing it to radiant heat under conditions such that the transfer of heat from other sources, including the surrounding air, is minimized. It is important that the surrounding air not be heated to such an extent that roasting occurs or that moisture-laden air accumulate around the food preventing the food surface from becoming crisp. Thus a continuous circulation of relatively cool air around the food is desirable.

Broiling in the open over a bed of coals or in the ovens with which most domestic ranges are equipped can generally be carried on with assurance that adequate air circulation is provided. In the latter instance, it is common practice to leave the oven door partially open so that air may circulate freely in the relatively large air space surrounding the broiling pan and rack commonly used to support the food. However, the problem of air circulation cannot be solved in this manner in small broiling ovens provided with the usual broiling pan.

Merely leaving the door of such a portable oven ajar does not provide sufficient air circulation for superior broiling performance for at least two reasons. First, the broiling pan which supports the food is necessarily large in relation to the size of the heating enclosure, and in conventional portable ovens the pan is supported in an intermediate position between the top and bottom walls. In this position it drastically interferes with free air circulation around the food. Second, the natural circulation of air in adequate volume is limited by the relatively small air space within the heating enclosure of conventional portable ovens.

The general object of my invention is to provide an improved portable broiling oven so arranged that air is circulated around the food in adequate volume to assure superior broiling performance.

Another object of my invention is to provide an improved portable broiling oven including a broiling pan so arranged that the pan (and hence any melted fat or the like collected therein) is cooled by air convection.

Briefly stated, in accordance with one aspect of my invention, there is provided a broiling oven in which the heating enclosure is ventilated by a constant flow of air in a predetermined path, induced by natural convection. Air inlet and outlet openings in the enclosure are so arranged and the broiling pan is so positioned that fresh air is caused to flow into the oven along the bottom of the pan and then over the top of the pan and food placed thereon before passing out of the enclosure. In this way, the temperature of the air surrounding the food is maintained at a sufficiently low level to minimize roasting of the food, the humidity of the air is prevented from rising to such an extent that the surfaces of the food retain excessive moisture, and any fat collected in the pan is cooled so as to minimize smoking.

The subject matter which I regard as my invention is particularly pointed out and distinctly claimed in the concluding portion of this specification. My invention, however, both as to organization and method of operation, together with further objects and advantages thereof, may best be understood by reference to the following description taken in connection with the accompanying drawings in which:

Figure 2:
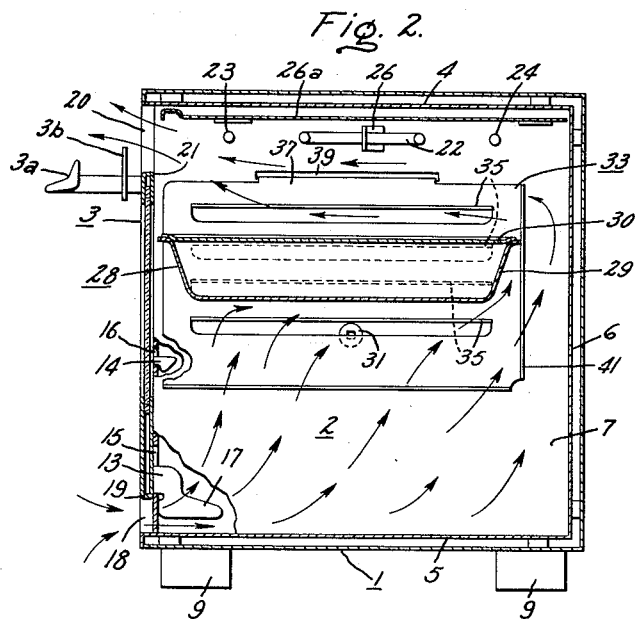
FIG. 2 is a cross-section view taken along line 2—2 in FIG. 1, a portion of the side wall of the oven being broken away to show details of construction.
Figure 3:
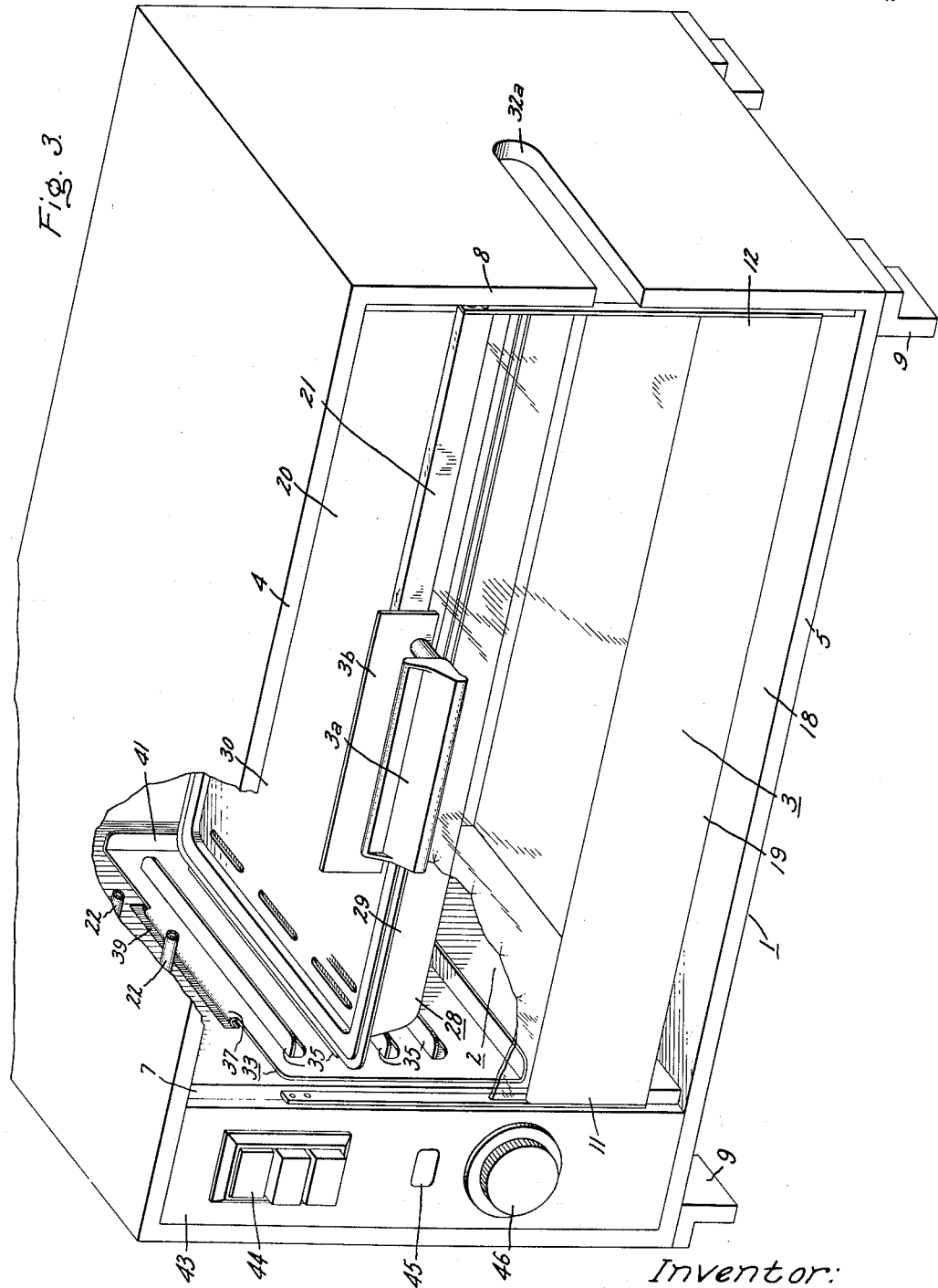
FIG. 3 is an enlarged perspective view of the same oven, some parts being broken away to show details of construction.

Referring to the drawings, the numeral 1 generally designates a portable broiling oven having a heating enclosure 2 provided with a door 3 for partially closing the front opening thereof. A handle 3a is secured to the upper portion of the door, and a shield 3b is attached to the handle so as to protect it from direct radiant energy from the heating element and spattered grease and the like. Heating enclosure 2 is formed by a top wall 4, a rear wall 6 and a pair of side walls 7 and 8. Each of these walls may include a pair of spaced sheet metal panels having an insulating space therebetween, as shown in FIG. 2. In this way, heat transfer through the walls is reduced and the exterior surfaces of the oven will not become excessively hot during cooking operations. A plurality of feet 9, preferably four in number, are secured to the bottom surface of bottom wall 5 so that oven 1 may be supported on a kitchen counter top or the like. Legs 9 may be made of a phenolic plastic material, for example, and are of sufficient height to reduce heat transfer between bottom wall 5 and the surface on which the oven rests sufficiently to prevent overheating of the supporting surface.

Door 3 which may include a window of heat resistant glass is mounted for pivotal movement about an axis adjacent its lower edge 4, and is preferably provided on each of its side edges 11 and 12 with hinge members 13 and latching members 14 secured thereto. Hinge members 13 cooperate with vertical slots 15 formed in the lower front edges of side walls 7 and 8 while latch members 14 cooperate with smaller vertical slots 16 formed in the mid-portion of the front edges of side walls 7 and 8. Slots 16 are sufficiently long to allow the enlarged end portion of latch members 14 to pass therethrough when the door 3 is moved upwardly a sufficient distance to allow the enlarged portion of the latch members to clear the lower edges of slots 16. Thus the door 3 may be supported in its closed position, as shown in FIG. 2, or it may be lifted slightly and then pivoted to a substantially horizontal open position in which stop portions 17 of hinge members 13 engage the portions of side walls 7 and 8 immediately above slots 15. Further, hinge members 15 are shaped so that they may be withdrawn entirely through slots 15 when door 3 is in a partially open position, thus permitting the door to be completely removed for cleaning purposes.

In accordance with my invention, an air inlet opening 18 adjacent the bottom edge 19 of door 3 and an air outlet opening 20 adjacent the top edge 21 of the door are provided for the purpose of allowing air to circulate within heating enclosure 2. Preferably air inlet opening 18 is defined by the bottom edge 19 of door 3, the front edge of bottom wall 5 and the front edges of portions of side walls 7 and 8. Similarly, air outlet opening 20 is formed by the upper edge 21 of the door, the front edge of top wall 4 and front edge portions of side walls 7 and 8.

Radiant heat for broiling purposes is provided by a suitable electric heating unit 22 located in the upper portion of heating enclosure 2 adjacent top wall 4. While various types of heating units may be used, I prefer to provide a tubular sheath type heating element of sinuous looped configuration having its terminal end portions 23 and 24 extending through side wall 7. The looped portions of heating unit 22 are supported by two brackets 25 secured to side wall 8 and a bracket 26 secured to side wall 7. If desired, a removable sheet metal reflector shield 26a may be supported in an intermediate position between heating unit 22 and top wall 4 in parallel relation to the latter.

Figure 1:
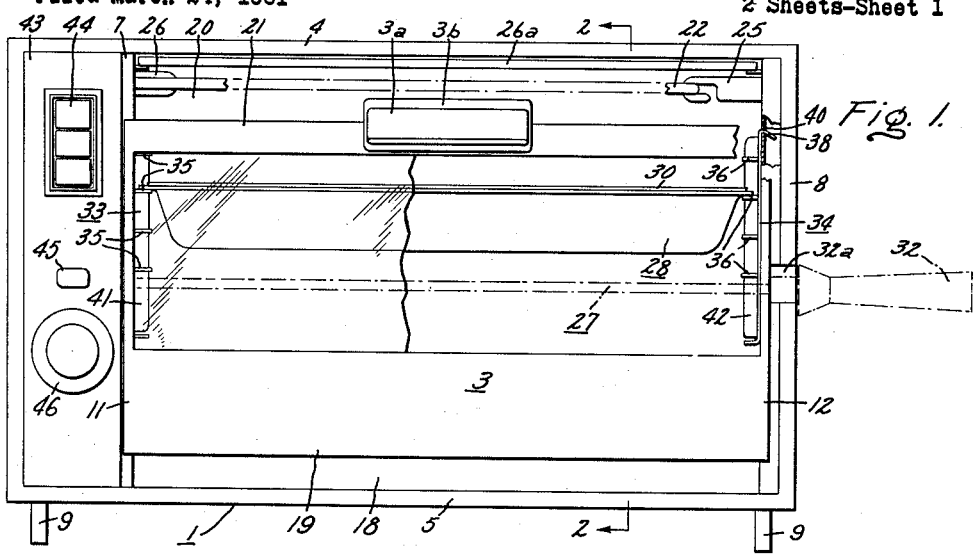
FIG. 1 is a front elevation view of a broiling oven constructed in accordance with my invention.

Food may be supported within heating enclosure 2 either on a removable rotary spit 27 (shown in broken lines in FIG. 1) or on a broiling pan 28 which includes a pan portion 29 and a perforated rack portion 30. It will be understood that when spit 27 is used, it is supported at one end in a rotary motor-driven spindle 31 mounted on side wall 7 while the end portion adjacent its handle 32 is supported in a slot 33 formed in side wall 8. Further, when spit 27 is used to support the food being cooked, broiling pan portion 29 is placed on bottom wall 5 so as to collect the drippings formed as cooking proceeds.

When broiling pan 28 is used to support food it will be understood that it is supported on rack portion 30 which in turn rests on pan portion 29, and that drippings are collected in pan portion 29 after passing through the perforated portions or slots in rack 30.

Foods of various types and thicknesses must be positioned at various distances from heating unit 22 for best broiling results, and accordingly, means are provided for supporting broiling pan 28 in various vertically spaced positions. Since pan 28 must be substantially as wide as bottom wall 5 if the various foods prepared in broiling ovens are to be accommodated, the side edges of the pan rest in close proximity to side walls 7 and 8 of the heating enclosure, and are utilized to support the pan in the various positions required. The means for supporting the broiling pan include a pair of removable plates 33 and 34 adapted to be supported on side walls 7 and 8 respectively, in generally parallel relationship therewith. Plate 33 includes a plurality of spaced parallel ledges 35 arranged to support a side edge of pan 28 for horizontal sliding movement through the front opening of the heating enclosure. Likewise, plate 34 includes a plurality of spaced parallel ledges 36 arranged to support the opposite side edge of pan 28 in a similar manner. Ledges 35 and 36 may be conveniently formed as integral parts of plates 33 and 34, respectively, and as shown in FIG. 2 may be formed by cutting and bending elongated portions so as to extend at an angle of 90° therefrom. Further, plates 33 and 34 may be conveniently provided with hook portions 37 and 38 along the top edges thereof in order that the plates may be removably supported on the side walls of the heating enclosure. For this purpose, side wall 7 is provided with an elongated horizontal slot 39 adapted to receive hook portion 37 of plate 33 while side wall 8 is provided with horizontal slot 40 so arranged that portion 38 may be supported therein. In this way, the plates 33 and 34 may be easily removed for cleaning purposes, and need not be placed in the oven at all when spit 27 is utilized.

In accordance with my invention, broiling pan 28 is so shaped that when positioned with its front edge in close proximity to door 3 as shown in FIG. 2, an air passageway is provided between its rear edge and rear wall 6. By means of this arrangement, and the arrangement of air inlet opening 18 and air outlet opening 20, an air flow pattern indicated by the arrows shown in FIG. 2 is established upon energization of heating unit 22. Air in the space between broiling pan 28 and top wall 4 of the heating enclosure is maintained at a higher temperature than is the air space between the broiling pan and bottom wall 5, and the heated air above the broiling pan passes out through outlet opening 20. Thus, by the process of natural convection an air flow pattern is established as indicated in FIG. 2, and cool air entering through inlet opening 18 passes along the bottom of broiling pan 28 before flowing upwardly along the rear edge of the pan and finally over the top of the pan and the food before proceeding through outlet opening 20. In this manner, the broiling pan 28 is maintained at a relatively low temperature, sufficient to eliminate or at least minimize, smoking of the melted fat collected in the pan. At the same time, the air space surrounding the top of broiling pan 28 and the food is constantly supplied with fresh air which prevents the air temperature surrounding the food from rising excessively. Thus, roasting of the food is avoided and the humidity of the surrounding air is prevented from rising to such an extent that the food remains excessively moist. The resulting broiling performance has proved to be superior to that obtainable in conventional portable ovens heretofore available.

It is important that broiling pan 28 be positioned in heating enclosure 2 with its front edge in close proximity to door 3, as shown in FIG. 2. Otherwise, the air flow pattern within the heating enclosure would be "short-circuited" and would follow a path upwardly along the inner surface of door 3 without passing along the bottom of the broiling pan and over the top of the food.

In ordinary use, the food to be broiled is placed on broiling pan 28 while the pan is completely outside the oven and the pan is then placed on ledges 35 and 36 without, however, pushing it entirely in the oven. The door is then closed, and in moving to closed position it contacts the front edge of the pan and pushes it to the position shown in FIG. 2. However, this procedure might not be followed in all instances, and it is desirable to provide some more positive means of assuring that the broiling pan will be properly positioned. One way of accomplishing this result is to provide operating instructions with each oven, specifically pointing out that the front edge of the broiling pan must rest in contact with door 3, and such instructions might be stamped on a portion of the oven itself or set forth in an instruction booklet accompanying each oven.

However, in the presently preferred embodiment of my invention, positive means are provided for positioning broiling pan 28 in the proper relation to the walls of the oven. This is accomplished by forming the rear edges of plates 33 and 34 with flanges 41 and 42, respectively, each of which extends inwardly from the side wall adjacent thereto and provides stop means for limiting the rearward movement of pan 28. Thus, when pan 28 is placed in the heating enclosure, its position is positively located by flanges 41 and 42 which limit rearward movement, by door 3 which limits forward movement, and by plates 33 and 34 which limit lateral movement. Hence, during cooking operations the air flow pattern shown in FIG. 2 will necessarily be established.

Various controls and related components useful during cooking operations may be mounted in a compartment located adjacent side wall 7 of the heating enclosure and provided with a front control panel 43. Within this control compartment are mounted an electric motor (not shown) arranged in driving engagement with rotary spindle 31, a pushbutton switch 44 connected in circuit with heating unit 22 and preferably also in circuit with the spit motor so that either the heating unit alone or the heating unit and the motor may be energized, according to the cooking procedure desired. An indicator light 45 may be also provided so as to indicate when the heating unit 22 is energized. Finally, a timer switch (not shown) provided with a control knob 46 may be utilized to provide timed cooking operations. However, it will be understood that various means for controlling the energization of heating unit 22 may be provided, and that my invention is not limited to the particular control panel arrangement disclosed herein.

While I have disclosed a particular embodiment of my invention, I do not desire the invention to be limited to the specific construction disclosed, and I intend by the appended claims to cover all modifications within the true scope of my invention.

What I claim is:

1. A broiling oven comprising: a top wall, a bottom wall, a rear wall and a pair of side walls forming an enclosure having a front opening; radiant heating means in the upper portion of said enclosure; a door mounted in the front opening of said enclosure, each of the side edges of said door being substantially in contact with the one of said side walls adjacent thereto so as to block air flow therebetween; means forming an air inlet opening adjacent the bottom edge of said door; means forming an air outlet opening adjacent the top edge of said door; a broiler pan supported in said enclosure in spaced parallel relation to said top and bottom walls with its front edge in close proximity to and substantially in contact with said door each of its side edges lying substantially in contact with the one of said side walls adjacent thereto so as to block air flow therebetween and its rear edge being spaced from said rear wall so that air may circulate therebetween; and means in said enclosure for supporting said pan in the aforementioned position.

2. A broiling oven as defined in claim 1 in which said pan supporting means includes a pair of removable plates each adapted to be supported on one of said side walls in parallel relation therewith, each of said plates having a plurality of spaced parallel ledges arranged to support a side edge of said pan for horizontal sliding movement through said front opening, and means for releasably supporting said plates on said side walls with said ledges disposed horizontally and projecting away from the adjacent side wall.

3. A broiling oven as defined in claim 2 including stop means carried by said plates for limiting rearward sliding movement of said pan when supported thereon, said stop means being positioned so as to retain the front edge of said pan in close proximity to and substantially in contact with said door.

4. A broiling oven as defined in claim 1 in which said air inlet opening is defined by portions of the front edges of said side and bottom walls and the lower edge of said door, and said air outlet opening is defined by portions of said side and top walls and the upper edge of said door.

5. A broiling oven as defined in claim 4 in which said door is mounted in the front opening of said enclosure by hinge means providing a horizontal pivotal axis adjacent the lower edge of the door, and which includes a handle secured to the upper edge of the door and a radiant heat and spatter guard plate carried by the door intermediate the handle and the adjacent portion of said outlet opening, said spatter guard plate being generally parallel to and extending above the upper edge of the door so as to shield the handle from radiant heat and spattered grease produced in the enclosure during cooking operations.

6. A broiling oven comprising: a top wall, a bottom wall, a rear wall and a pair of side walls forming an enclosure having a front opening; radiant heating means in the upper portion of said enclosure; a door mounted in the front opening of said enclosure, each of the side edges of said door being substantially in contact with the one of said side walls adjacent thereto so as to block air flow therebetween; means forming an air inlet opening adjacent the bottom edge of said door; means forming an air outlet opening adjacent the top edge of said door, a broiler pan supported in said enclosure in spaced parallel relation to said top and bottom walls with its front edge in close proximity to and substantially in contact with said door each of its side edges lying substantially in contact with the one of said pair of side walls adjacent thereto so as to block air flow therebetween and its rear edge being spaced from said rear wall so that air may circulate therebetween; and means in said enclosure for supporting said pan in the aforementioned position, said supporting means including a plurality of removable supporting members each adapted to be supported on one of said side walls in parallel relation therewith, each of said support members having at least one ledge portion arranged to support a side edge of said pan for horizontal sliding movement through said front opening, and means for releasably supporting said support members on said side walls with said ledge portions disposed horizontally and spaced from the adjacent side wall.

7. A broiling oven as defined in claim 6 including stop means carried by said ledge portions for limiting rearward sliding movement of said pan when supported thereon, said stop means being positioned so as to retain the front edge of said pan substantially in contact with said door.

8. A broiling oven as defined in claim 6 in which said air inlet opening is defined by portions of the front edges of said side and bottom walls and the lower edge of said door, and said air outlet opening is defined by portions of said side and top walls and the upper edge of said door.

References Cited in the file of this patent

UNITED STATES PATENTS

| | | |
|---|---|---|
| 2,511,328 | Cline | June 13, 1950 |
| 2,561,517 | Lodge | July 24, 1951 |
| 2,604,033 | Chadwick | July 22, 1952 |
| 2,739,584 | Hupp | Mar. 27, 1956 |
| 2,846,557 | Schulze | Aug. 5, 1958 |
| 2,956,497 | Bernstein | Oct. 18, 1960 |